Jan. 16, 1951 D. J. BAKER Re. 23,327

PICKUP WITH REED OF MAGNETIC MATERIAL

Original Filed March 12, 1945 2 Sheets-Sheet 1

Inventor

DONALD J. BAKER

By W E Beatty

Attorney

PICKUP WITH REED OF MAGNETIC MATERIAL

Original Filed March 12, 1945 2 Sheets-Sheet 2

Inventor
DONALD J. BAKER
By W. E. Beatty
Attorney

Reissued Jan. 16, 1951

Re. 23,327

UNITED STATES PATENT OFFICE 23,327

PICKUP WITH REED OF MAGNETIC MATERIAL

Donald J. Baker, Los Angeles, Calif.

Original No. 2,422,317, dated June 24, 1947, Serial No. 582,332, March 12, 1945. Application for reissue June 22, 1950, Serial No. 169,766

31 Claims. (Cl. 179—100.41)

Matter enclosed in heavy brackets [ ] appears in the original patent but forms no part of this reissue specification; matter printed in italics indicates the additions made by reissue

This invention relates to pickup head constructions useful in phonographs and other sound reproducing apparatus.

One general object of the invention is to greatly simplify the construction of a pickup head over constructions now in common use.

Another general object is to reduce the total weight of the pickup head, and also reduce the mass of the vibrating parts.

A specific object of the invention is to eliminate the usual pivot or trunnion bearings for supporting the vibrating stylus. In prior constructions it is common to mount the vibrating stylus for vibration about a substantially horizontal axis located in a vertical plane which is tangent to the groove being engaged by the needle, the stylus being arranged in a generally vertical position with its axis in line with the axis of the needle. Such arrangements involve the use of pivot bearings for supporting the trunnions which extend to the front and rear of the stylus. Such bearings are a source of many difficulties for which various solutions have been offered with varying degrees of success. One common arrangement involves the use of rubber bearings for the trunnions for the purpose of eliminating disturbing noises caused by the bearings. The main objection to such bearings is that the rubber deteriorates with age and becomes hard and inflexible. Cracks develop in the rubber and the bearings become noisy. Another serious objection to any rubber-pivoted armature suspension is the fact that the armature has an up and down motion known technically as vertical response, and this is very detrimental to this type of pickup, because it introduces distortion. This is the reason why special needles with the bent shank and the flattened parts have been introduced to overcome this difficulty.

Another specific object of the invention is to eliminate the usual needle socket and clamping screw carried by the stylus.

In accordance with my invention, the needle of the pickup head is permanently secured to the free end of a thin blade-like reed element or armature mounted in a vertical plane which is tangent to the groove being engaged by the needle, and the axis of the reed extends horizontally and parallel with the surface of the record, the rear end being fixed or clamped in a suitable base support. At least a portion of the reed at the free end thereof is made thin and flexible so that the needle may vibrate laterally or at right angles to the plane of the reed while the axis of the needle remains substantially parallel to its normal position. A pickup coil may be carried on or surround a fixed part of the reed or it may be carried on or surround the movable flexible part of the reed. The front end of the reed, including the needle, is arranged to vibrate between the poles of a permanent magnet which is preferably mounted in a substantially vertical plane at right angles to the plane of the reed. Vibration of the reed laterally causes magnetic flux to be established in the reed in one direction or the other depending upon whether the reed is near one pole or the other of the magnet.

My invention also involves the novel structure for damping the vibrating part of the reed to eliminate resonance effects.

My invention is illustrated in the accompanying drawing in which.

Figure 7F:
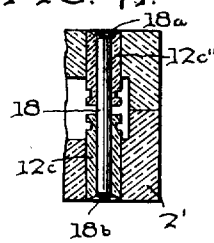
Figure 7:
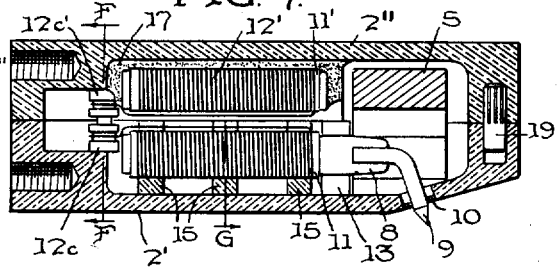
Figure 7G:
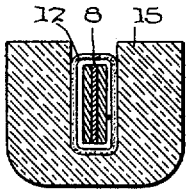
Figure 8:
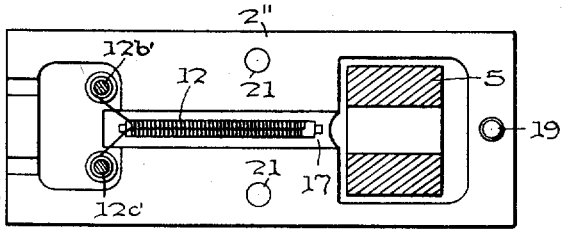
Figure 9:
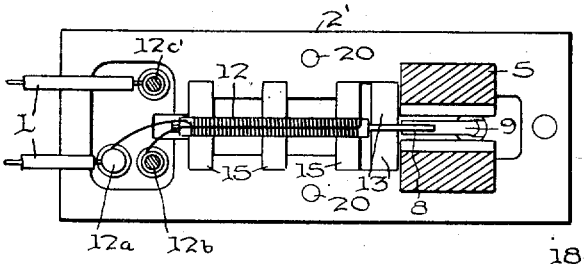
Figure 10:
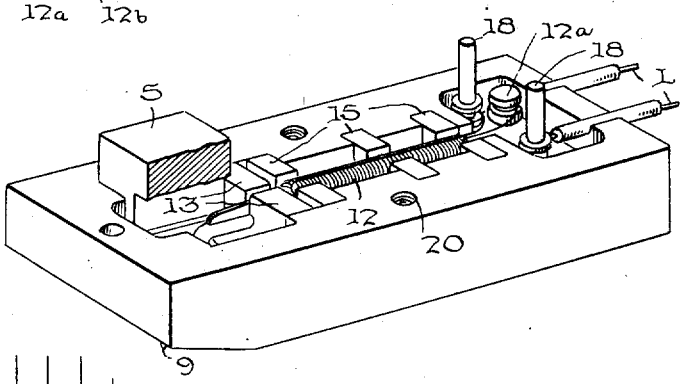

Figures 7 to 10 illustrate a modified construction involving a hum-bucking coil. Figure 7 is a longitudinal, sectional view; Figure 8 is a face view of the upper half of Figure 7; Figure 9 is a face view of the lower half of Figure 7; Figures 7F and 7G are sectional views of Figure 7 taken along the lines F—F and G—G, respectively; and Figure 10 is a perspective view of the lower half of Figure 7.

Figure 11:
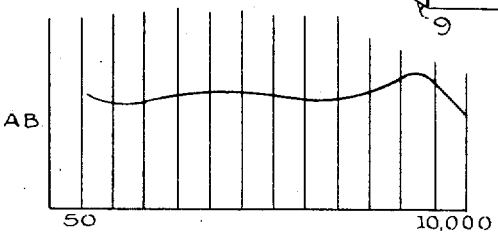

Figure 11 is a typical response curve for my pickup unit.

Referring to the drawing, 1 indicates the end of a tone arm which supports the pickup head. The pickup head has a casing 2 formed of nonmagnetic material such as molded plastic. The rear part of the casing is provided with a shank portion 2a having a reduced section which extends into the open end of the tone arm 1 and is secured to the tone arm by a suitable screw 3. The casing also has a removable section or cover 2b which is secured to the main section by suitable screws 4a and 4b.

At the front of the casing 2 a permanent magnet 5 is mounted in a vertical plane transversely of the axis of the pickup head, the magnet being mounted in inverted position so that the gap between the poles of the magnet includes the median plane of the pickup head which is normally tangent to the groove of the record being engaged by the needle. The magnet 5 is mounted in a socket formed by vertical walls 2c, 2c' arranged on opposite sides of the magnet and preferably formed integral with the base of the casing.

Figure 2:
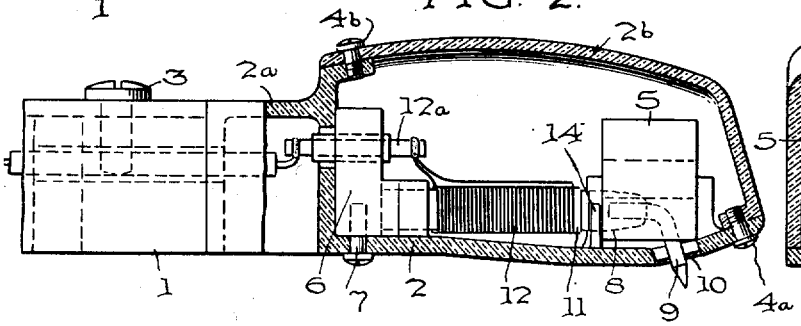
Figure 2 is an elevational view of Figure 1 showing the casing of the pickup head in longitudinal section.

In the rear of the casing 2 a block of brass 6 or other suitable metal is secured in position within the casing by suitable fastening means represented by screw 7 and is provided with a forwardly extending portion at the lower part thereof which serves to support the rear end of a horizontal reed 8, the free end of which extends into the gap between the poles of the magnet 5 as shown in Figure 2. The rear end of the reed enters a vertical slot formed in the forwardly extending lower portion of block 6 and is soldered or otherwise secured to the block. On the forward end of the reed 8 is mounted a needle 9 which is preferably formed of magnetic material such as steel, although it may be formed of non-magnetic material. The needle is permanently secured to the end of the reed in any suitable manner; for example, the end of the shank of the needle is bent to assume a horizontal position while in use, and the horizontal portion of the shank is slotted by a sawcut or otherwise to receive the thin end of the reed 8, and the two parts are soldered or otherwise secured together. The needle extends downwardly at an angle inclined to the surface of the record in the usual manner, passing through a hole formed in the bottom wall of the casing 2. A washer or gasket 10 preferably formed of a thin sheet of synthetic rubber is sealed within the needle opening and surrounds the needle to seal the casing 2 against entrance of dust and magnetic particles which might impair the operation of the pickup head. It must be understood that this very thin rubber, which is only .001 to .002 thick, in no way acts as a dampening agent. Preferably, the needle 9 is flattened in the plane of the air gap so as to prevent undue interference with the poles of the magnet and to permit the use of a narrow air-gap.

Figure 4:
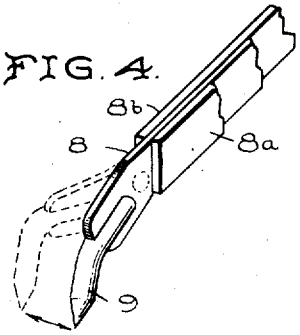
Figure 4 is a perspective view showing the end of the needle-supporting reed and illustrating the manner of movement of the needle.

The reed 8 may be formed of a solid piece of magnetic material such as silicon steel, or it may be formed of a laminated structure as shown in Figure 4. In this arrangement, the reed is formed of three strips of magnetic material joined together in any suitable manner as by spot welding or soldering. The middle strip which is longer than the two side strips carries the needle 9, and, as shown in the drawing, this strip is much thinner than the needle itself. I have found that a silicon steel strip having a thickness of 0.008 inch gives satisfactory results. The two outside strips 8a and 8b may be formed of the same or greater thickness. I have secured good results by forming the outside pieces of a strip having a thickness of 0.018 inch, all three strips being $\frac{3}{16}$ of an inch wide. With this construction, the three-ply portion of the reed is substantially rigid, but the forward portion is flexible and the end of the reed is free to flex or vibrate about a vertical axis. The reed 8 may be formed of a solid piece of magnetic material where the flexible end part is formed by cutting down the end of the reed to a narrow section. Also, the entire reed may be formed of a single flexible strip of the same thickness throughout, as will appear hereinafter.

The rear portion of the reed between the magnet 5 and the block 6 is wound with a sleeve of suitable insulating material 11 on which is wound a pickup coil 12. The ends of the coil 12 are connected to suitable terminals 12a and 12b which are mounted within insulating sleeves passing through holes formed in block 6, and the rear ends of these terminals are connected by suitable conductors with amplifying apparatus not shown.

Figure 1:
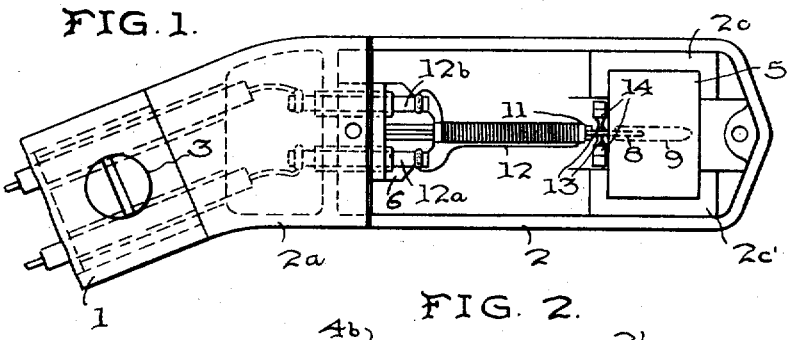
Figure 1 is a plan view of one form of my pickup head showing the cover removed.

For the purpose of damping out resonance effects in the vibrating portion of the reed, I provide damping material in contact with opposite sides of the thin part of the reed as shown at 13 in Figure 1. The damping arrangement is designed to use a minimum amount of damping material, because the less the mass of this material, the less mass the needle has to move. This damping material is inserted between the vibrating reed and a pair of fixed stops 14 mounted on the base of the casing 2, and these stops may be an integral part of the vertical walls 2c and 2c' forming the socket for magnet 5, or they may be formed separately from these walls. The damping material 13 may be formed of small blocks of suitable material inserted between the reed and the stops 14, but I prefer to form these damping elements by applying a small drop of liquid substance between each side of the thin part of the reed and the thick stops 14. When the substance dries it forms a connecting bond between each side of the reed and each of the fixed stops 14, the connecting bonds having the property of damping out resonance effects. The material which I have found most suitable for this purpose is a commercial product of synthetic resin in liquid form.

Figure 3:
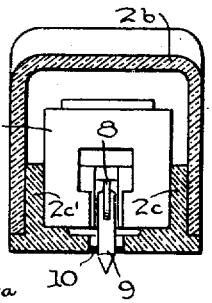
Figure 3 is a sectional view of Figure 2 taken along the line 3—3 except that certain elements are shown in elevation.
Figure 4A:
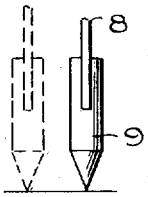
Figure 4a is a front view of Figure 4 showing the parallel movement of the needle.
Figure 5:
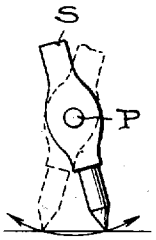
Figure 5 is a front view of the vibrating stylus of a prior construction.

In the operation of the arrangement illustrated in Figures 1 to 3, the needle is vibrated laterally by the groove in a lateral cut record, and the flexible end of the reed 8 is flexed by the needle as it moves from side to side. This action is shown in Figure 4 where the normal position of the needle 9 is shown in solid lines and the deflected position is shown in dotted lines, but the amount of deflection has been greatly exaggerated. The deflection of the end of the reed is such that the needle remains parallel to its original position, and this is more clearly illustrated in Figure 4a which is a view taken directly in front of the needle and shows the normal position of the needle in solid lines and the deflected position in dotted lines. It is understood that this parallel motion is only between narrow limits at the greatest amplitude. In the record itself it does not travel over .002 of an inch, but this parallel type of motion which I employ is not parallel beyond .008 of an inch from center. In other words, the parallel motion from one extreme to the other is about .015 of an inch. From then on the reed starts to lie over more as greater motion is attempted. From Figure 4a it will be understood that the axis of the needle when deflected to either side of its normal position remains substantially parallel with its original position. This is in contrast with the angular shifting of the needle in prior arrangements where the stylus is mounted on trunnions to vibrate about a substantially horizontal axis parallel with the record groove. The action of such an arrangement is illustrated in Figure 5 which is a front view of the stylus S pivoted at P and showing one extreme position of the needle in solid lines and the opposite position of the needle in dotted lines. It is clear that the axis of the needle swings about the pivot point P and the point of the needle engages the groove of the record with a different angular relation for different positions of the needle. The advantage of my type of stylus and needle mounting is that it maintains a constant angular relation between the needle and the surface of the record and thereby eliminates the scratch and wear on the record due to the varying angular position of the needle with respect to the groove in the old arrangement. Also, in my construction, the point of the needle travels parallel to the face of the record whereas in Figure 5 it travels in an arc with respect to the face of the record.

In Figures 1 to 3, it will be understood that the section of the reed carrying the pickup coil 12 remains substantially stationary and only the thin front end of the reed is vibrated. By this construction the entire mass of the movable part can be reduced to as low as 0.1 gram, and the response curve for this type of pickup remains substantially flat up to frequencies in excess of 10,000 cycles per second and approaching 15,000 cycles per second.

Figure 6:
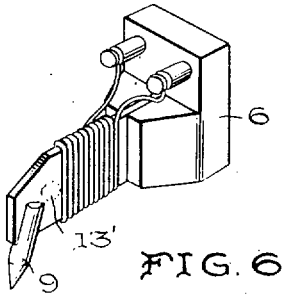
Figures 6 and 6a show a modified construction of the arrangement shown in Figures 1 to 3.
Figure 6A:
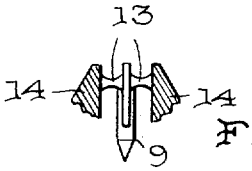

It will be understood that the end of the reed projecting into the air gap of the magnet 5, and the needle carried by the reed, are normally positioned substantially at the center of the air gap, and no substantial amount of magnetic flux is carried by the portion of the reed surrounded by the coil 12. As soon as the needle is moved from the center of the air gap towards one of the poles, magnetic flux will be established in that part of the reed which is surrounded by the coil 12 in one direction depending upon which pole is being approached by the needle. If the needle moves in the opposite direction from its normal position, the magnetic flux established in coil 12 will be in the opposite direction, and the continuous vibration of the needle to opposite sides of its normal position will cause an alternating voltage to be induced in coil 12 having a frequency or frequencies corresponding to the rates of vibration of the needle. Thus, reed 8 constitutes a magnetic armature for the pickup.

Where the entire length of the reed is formed of a thin flexible blade, and the coil is carried by the flexible part of the blade, the over-all length of the blade may be materially shortened and the pickup coil would be shortened correspondingly, such an arrangement being shown in Figure 6. This figure also shows how the needle 9 may be mounted on the reed by simply slotting the straight shank of the needle at the end for receiving the end of the reed and soldering the two elements together. In this way a shorter needle may be used and the vibrating mass reduced accordingly. The damping material bonds or blocks are applied to opposite sides of the reed in the same manner as described above for Figures 1 and 2, and the point of application of these damping elements is indicated by the dotted circle 13' in Figure 6. Figure 6a is a front view of the reed of Figure 6 showing how the damping connections or bonds are applied between the reed and the stops 14. Preferably the coil 12 is carried by the magnetic reed and vibrates with it, although the coil could be wound on an insulating sleeve which surrounds the reed with enough clearance to permit vibration of the reed without moving the coil.

In an actual model constructed according to

Figure 6 the reed 8 was formed of a strip of silicon steel having a thickness of 0.008 inch, a width of $\frac{3}{16}$ of an inch and the length of the flexible portion extending out from the block 6 was only $\frac{3}{16}$ of an inch. The coil 12 was formed of 75 turns of No. 44 enamel-covered wire and had an impedance of approximately 30 ohms at 1000 cycles per second. The total weight of the vibrating mass was approximately 0.18 gram. The response curve for this model was substantially flat for all frequencies up to 12,000 cycles per second.

I prefer to form the vibrating portion of the needle-supporting reed relatively short and thin so that the resonant frequency of the vibrating part of the stylus will be in the higher frequencies of the audio range or above this range. If the natural frequency of the reed and the attached needle is above the essential audio range, for example, if the natural frequency is 20,000 cycles per second, then it will not be necessary to provide any damping of the reed since the frequency response over the audio range will be substantially constant. By properly selecting the resonant frequency of the reed and using the proper amount of damping, it is possible to obtain almost any desired response characteristic. I have found that a reed which has a natural period of vibration around 10,000 to 12,000 cycles per second gives good response at the higher audio frequencies and yet provides extremely low lenience or compliance, and requires very little damping to correct for distortion due to resonance. A typical response curve for a pickup designed according to my invention is illustrated in Figure 11.

The preferred position of the magnet 5 is in a vertical plane as shown in Figure 2, but the magnet could be arranged in a horizontal plane or in any intermediate plane. For example, in the case of the arrangement illustrated in Figure 6, the yoke of the magnet might extend around to the back of the block 6.

The novel construction of the pickup head as described above and illustrated in Figures 1, 2, 3 and 6 involves the following novel features and advantages:

1. The axis of the needle remains parallel to its normal position during vibration and at right angles laterally to the surface of the record. This reduces the amount of needle scratch and the amount of wear on the record by the needle.

2. The thin reed mounting of the needle provides extremely great compliance or lenience of the mounting and there is very little stiffness to be overcome in vibrating the needle. This allows low tracking pressures on the needle, as low as 2 grams.

3. The needle-supporting reed is mounted with its longitudinal axis horizontal and parallel with the surface of the record and substantially at right angles to the axis of the needle. The flexing of the reed causes the needle to move about a substantially vertical axis and the point of the needle travels parallel with the surface of the record. This is in contrast to prior arrangements where the stylus vibrates about a substantially horizontal axis and the point of the needle travels in an arc with respect to the surface of the record.

4. The construction is simple in arrangement and may be easily manufactured.

5. The mass of the entire system is extremely low, thereby eliminating unnecessary wear of the needle on the record, and vice versa.

6. The mass of the vibrating parts is very low, resulting in a flat response characteristic over a wide frequency range.

7. The arrangement of the needle-supporting reed in a vertical plane provides greater ruggedness in spite of the absence of mass, because the on-edge mounting of the reed provides greater stiffness against upward thrust of the needle but permits lateral vibration. This results in more faithful reproduction and avoids distortion due to vertical movement of the needle which occurs in prior art structures using rubber pivot bearings.

8. The response characteristic may be easily controlled by providing different amounts of damping on the needle-supporting reed.

9. The pickup head does not involve the use of materials which are adversely affected by extreme conditions of temperature and humidity.

10. By the use of short, thin reeds having a natural rate of vibration in the upper frequencies of the audio range, the response characteristic for the high audio frequencies is improved.

In the arrangement of Figures 7 to 10 the casing is divided along a horizontal plane and is formed of a lower section 2′ and an upper section 2″. Parts serving the same or similar functions as corresponding parts in Figures 1 to 3 are indicated by like reference numerals. The permanent magnet 5 is mounted in a suitable socket formed in the front end of the lower section 2′, and the needle-supporting reed 8 carrying the pickup coil 12 is also mounted in the lower section but is supported in a different manner from Figures 1 and 2. The reed with the pickup coil wound thereon is supported within slots formed in "Viscoloid" blocks 15 positioned at each end and at the center of the coil 12. The coil is tightly wound around a cellophane sleeve wrapped around the reed, and the blocks 15 press firmly against the sides of the coil to hold the reed and coil assembly in proper position. If there is any looseness between the coil and the block, or between the blocks and the casing, these elements may be cemented together by a suitable cement. Figure 7G is a sectional view of the reed and coil assembly taken through the center block. The "Viscoloid" blocks 15 serve to damp out any resonance effect in the rear portion of the reed carrying the pickup coil. These blocks may be formed of other damping material than "Viscoloid."

The forward flexible end of the reed 8 is suitably damped by a pair of blocks of damping material 13 mounted on opposite sides of the reed and having contact therewith, see Figure 9.

One end of pickup coil 12 is connected to a terminal 12a mounted in the rear end of section 2′, and the other end of the coil is connected to a second terminal 12b. One of the leads L for the pickup unit is connected to terminal 12a and the other lead is connected to a terminal 12c mounted in the same cavity with terminals 12a and 12b. These two leads are admitted to the terminal cavity through half-round slots formed in each section of the casing.

In the upper section 2″ of the pickup casing a hum-bucking coil 12′ is arranged parallel with and immediately above the pickup coil 12. This coil has a magnetic core 8′ built substantially like the needle-carrying reed 8, and the coil is wound on an insulating sleeve 11′ carried by the core 8′. The hum-bucking coil is positioned within a longitudinal slot formed in the face of the upper casing section 2″ and is secured in position by suitable cementing material shown at 17. One end of coil 12′ is connected with terminal 12b′ positioned in a cavity in the rear end of the casing section 2″, and the other end of the coil is connected to terminal 12c′. Terminals 12b′ and 12c′ are arranged to be in axial alignment with terminals 12b and 12c, respectively, and all four of these terminals are formed with an axial bore. When the two halves of the casing are placed in matching relation, a conducting wire or pin 18 is inserted in the aligned bores of the two pairs of terminals for the purpose of connecting the upper and lower terminals together. This arrangement is clearly shown for terminals 12c and 12c′ in Figure 7F. The two ends of the connecting wire 18 may be soldered to the respective terminals as shown at 18a and 18b in Figure 7F. By the arrangement just described, the two coils 12 and 12′ are connected in series between the leads L of the pickup unit, and it is important that the ends of the two coils be connected to the proper terminals in order that the two coils are connected in opposing relation, that is, the two coils should be so connected that if they were energized by direct current, one coil would produce a north pole at the front end while the other coil would produce a south pole at the same end. With this arrangement, the coil 12′ serves to cancel out or neutralize any disturbing voltage which might be induced in coil 12 by an external magnetic field acting on the coil or on reed 8. By arranging the coil 12′ parallel with and close to the coil 12, any disturbance due to an external magnetic field may be substantially neutralized. Such disturbances might come from the field of the motor driving the turntable or from other sources. For the purpose of aiding in the assembly of the two casing sections and holding the two sections in proper matching relation, a pilot pin 19 is carried by the front end of the upper casing section and is arranged to enter a socket formed in the face of the lower section. This pin, and the two connecting pins 18 positioned at the rear of the unit serve to hold the two casing sections in proper position. The two sections are securely clamped together by suitable screws threaded into threaded holes 20 formed in the lower casing section, the heads of the screws being seated in countersunk holes 21 formed in the upper casing section.

It will be obvious that the pickup constructions described herein may be adapted for use as a recording head by substituting a recording stylus for the pickup needle and by supplying electric signals to the coil surrounding the armature. Accordingly, the appended claims are to be interpreted broadly as covering devices for either recording or reproducing electric signals.

I claim:

1. An electric translating device comprising, in combination, a magnet having a narrow air-gap arranged in a vertical plane, a thin, flexible, relatively broad magnetic reed mounted on-edge in the median plane of said air-gap with its axis in a substantially horizontal position, means for rigidly supporting one end of said reed with the other end thereof being free and positioned within said air-gap, said supporting means serving to prevent upward flexure of said free end but permitting lateral flexure thereof, a stylus secured to and supported entirely by the free end of said reed with its axis located substantially in the plane of said reed and extending substantially at right angles to the axis of said reed, and an electric coil surrounding a portion of said reed.

2. An electric translating device according to claim 1 wherein said magnet is mounted in a substantially vertical plane transversely of the plane of said reed.

3. An electric translating device according to claim 1 wherein said stylus is formed of magnetic needle and the shank thereof is positioned within the air-gap of said magnet.

4. An electric translating device according to claim 1 wherein said coil surrounds a fixed portion of said reed adjacent said supporting means.

5. An electric translating device according to claim 1 wherein said coil is wound upon and carried by a flexing portion of said reed.

6. A stylus mounting for an electric translating device comprising, in combination, a thin, flexible, relatively broad magnetic reed mounted with its broad face in a vertical plane and its axis in a substantially horizontal position, means for rigidly supporting one end of said reed with its broad face in a vertical plane to thereby prevent upward flexure of the free end thereof while allowing lateral flexure of the unsupported end, and a stylus supported entirely by said reed near the free end thereof and with its axis located substantially in the plane of said reed and arranged substantially at right angles to the axis of said reed.

7. A mounting according to claim 6 wherein said stylus is formed of a magnetic needle having the shank thereof slotted for receiving the free end of said reed, said needle being permanently bonded to said reed.

8. A stylus mounting according to claim 6 and including a pair of fixed abutments mounted on opposite sides of a flexing portion of said reed and in spaced relation thereto, and a bonding connection between each of said fixed abutments and said reed, each connection comprising the dried residue of an adhesive resin applied in liquid form between said reed and each abutment.

9. A stylus mounting for an electric translating device comprising, in combination, a thin, flexible magnetic reed, means for rigidly supporting one end of said reed on-edge to permit flexure of the free end thereof about an axis transversely of the length of the reed, and a stylus supported entirely by said reed near the free end thereof with the axis of the stylus lying substantially in the plane of said reed and arranged substantially parallel with the axis of flexure of said reed, said reed and stylus assembly having a natural period of vibration in the upper audio frequency range.

10. An electric translating device according to claim 1 wherein said coil surrounds a portion of said reed spaced from said magnet, and including a pair of fixed blocks of damping material engaging opposite sides of said reed at a point between said magnet and said coil.

11. An electric translating device according to claim 1 wherein said stylus is formed of a magnetic needle having the shank thereof slotted for receiving the free end of said reed, at least a portion of said slotted shank being positioned within the air-gap of said magnet.

12. An electric translating device according to claim 1 wherein said stylus is formed of magnetic material and has a horizontally arranged shank portion positioned within the air-gap of said magnet and a tip portion extending downwardly out of said air-gap.

13. A mounting according to claim 6 wherein said stylus is formed of magnetic material and has a straight shank portion arranged coaxially with said reed and a tip portion extending downwardly from said shank portion to a point beyond the lower edge of said reed.

14. A mounting according to claim 6 wherein said stylus comprises a magnetic needle having a straight shank portion and a tip portion extending substantially at right angles to the shank portion, said shank portion and a part of said tip portion being slotted to receive the free end of said reed, and the two halves of said slotted portions being permanently bonded to opposite sides of said reed with the straight shank portion arranged horizontally and coaxially with said reed.

15. An electric translating device comprising, in combination, a magnetic structure including a pair of spaced pole pieces providing an air-gap in a vertical plane, an armature comprising an elongated magnetic reed formed of relatively thin strip material, mounting means for supporting said reed with its axis in a horizontal position and arranged substantially in the plane of said air-gap, said mounting means comprising a fixed support spaced from said pole pieces for rigidly supporting one end of said reed with the other end thereof being free and positioned adjacent said pole pieces to vary the flux distribution between said pole pieces and said reed when the free end of the reed moves transversely of the plane of said air-gap, the supported end of said reed having its broad face arranged in a vertical plane to provide relatively free lateral flexure of the reed while resisting upward flexure thereof, and a stylus supported entirely by said reed near the free end thereof, with its axis positioned substantially vertically, and a stationary pickup coil surrounding a part of said magnetic structure in which the flux is varied by transverse movement of the free end of said armature.

16. A stylus mounting for an electric translating device comprising, in combination, an elongated, relatively thin, flexible magnetic reed arranged wth its principal axis extending horizontally, means for rigidly supporting one end of said reed with the broad face thereof in a vertical plane to provide a greater degree of flexure of the reed horizontally than vertically, and a stylus supported entirely by said reed near the free end thereof and arranged with its axis substantially in a vertical direction.

17. A stylus mounting for an electric translating device comprising, in combination, an elongated reed-like member arranged with its principal axis extending horizontally, means for rigidly supporting one end of said member, the supported end of said member being relatively thin horizontally and wide vertically to provide a greater degree of flexure of said member about said supporting means horizontally than vertically, and a stylus supported entirely by said member near the free end thereof and having its axis arranged in substantially a vertical direction.

*18. An electric translating device comprising, in combination, a "U" magnetic structure having a pair of spaced pole pieces having parallel vertical faces providing an air-gap, an armature comprising an elongated magnetic reed formed of relatively thin, strip material, mounting means comprising a fixed support spaced from said pole pieces for rigidly supporting one end of said reed edgewise vertically with the longitudinal axis of the reed in a horizontal position and with the other end thereof being free and positioned to swing between said pole faces to vary the flux distribution between said pole pieces and*

*said reed when the free end of the reed moves across said air-gap, the supported end of said reed having its broad face arranged in a vertical plane to provide relatively free lateral flexure of the reed while resisting upward flexure thereof at its supported end, and a stylus supported entirely by said reed near the free end thereof with the axis of said reed positioned substantially vertically, and a stationary pickup coil surrounding a part of the said magnetic structure embodying said magnet and said reed in which the flux is varied by transverse movement of the free end of said armature.*

*19. A stylus mounting for an electric translating device comprising, in combination, an elongated, relatively thin, flexible magnetic reed arranged with its principal axis extending horizontally, means for rigidly supporting one end of said reed with the broad face thereof in a vertical plane to provide a greater degree of flexure of the reed horizontally than vertically, and a stylus supported entirely by said reed near the free end thereof and arranged with its axis substantially in a vertical direction, a magnetic structure positioned forwardly of said reed and having pole faces laterally spaced on opposite sides of the free end of said reed, and a base supporting said stylus and magnetic structure for movement of the point of said stylus in the plane of a lateral cut record.*

*20. A stylus mounting for an electric translating device comprising, in combination, an elongated, relatively thin, flexible magnetic reed arranged with its principal axis extending horizontally, means for rigidly supporting one end of said reed with the broad face thereof in a vertical plane to provide a greater degree of flexure of the reed horizontally than vertically, and a stylus supported entirely by said reed near the free end thereof and arranged with its axis substantially in a vertical direction, magnetic means having pole faces, a base of insulating material supporting said magnetic means forwardly of said reed with said pole faces laterally spaced on opposite sides of the free end of said freed, said stylus extending beyond the bottom of said base in position to engage a sound record.*

*21. A stylus mounting for an electric translating device comprising, in combination, an elongated magnetic reed-like member arranged with its principal axis extending horizontally, means for rigidly supporting only one end of said member for flexure about a vertical hinge axis, the other end of said member being free, the supported end of said member being relatively thin horizontally and wide vertically to provide a greater degree of flexure of said member about said supporting means horizontally than vertically, a stylus supported entirely by said member near the free end thereof and having its axis arranged in substantially a vertical direction, a magnetic structure having pole faces at opposite sides of said free end, and a coil inductively influenced by motion of said reed-like member.*

*22. A stylus mounting according to claim 21 wherein said hinge axis is adjacent the free end of said member, means for stiffening said member between said hinge axis and the supported end of said member.*

*23. A stylus mounting according to claim 22, the distance from the point of said stylus to the principal axis of said member being short, whereby said free end of said member is substantially free from torsion, the distance from the principal axis of said member to the stylus point being of the same order as the length of said hinge axis.*

*24. A stylus mounting according to claim 21 wherein said hinge axis is forwardly disposed on said member in space relation to the supported end of said member, the length of said member forwardly of said hinge axis being short and conducive to a high natural frequency of vibration, the distance from the point of said stylus to said member being short and conducive to freedom from torsion.*

*25. A stylus mounting for an electric translating device comprising, in combination, a thin, flexible magnetic reed, means for rigidly supporting one end of said reed on edge to permit flexure of the free end thereof about an axis transversely of the length of the reed, and a stylus supported entirely by said reed near the free end thereof with the axis of the stylus lying substantially in the plane of said reed and arranged substantially parallel with axis of flexure of said reed, said reed having a hinge axis forward of the supported end of the reed, said free end forward of said hinge axis being of small mass and short length whereby said reed and stylus assembly have a natural period of vibration in the upper audio frequency range.*

*26. A stylus mounting for an electric translating device comprising, in combination, a magnetic elongated reed-like member arranged with its principal axis extending horizontally, means for rigidly supporting one end of said member for swinging movement of the outer front end of said member about a vertical hinge axis, the supported end of said member being relatively thin horizontally and wide vertically to provide a greater degree of flexure of said member about said supporting means horizontally than vertically, a cooperating magnet having pole faces at opposite sides of said free end, and a stylus supported entirely by said member near the free end thereof, said stylus having its axis arranged in substantially a vertical direction and extending below said magnet for swinging with said free end about said hinge axis.*

*27. A stylus mounting for an electric translating device comprising, in combination, an elongated, relatively thin, flexible magnetic reed arranged with its principal axis extending horizontally, means for rigidly supporting one end of said reed with the broad face thereof in a vertical plane and stiffening means to provide a greater degree of flexure of the outer end of the reed horizontally than vertically, and a stylus supported entirely by said reed near the free end thereof and arranged with its axis substantially in a vertical direction, a magnetic structure having pole faces at opposite sides of said outer end of the reed, a coil influenced by motion of said reed, the flux varying through said reed as said reed approaches one or the other of said pole faces.*

*28. A stylus mounting for an electric translating device comprising, in combination, an elongated, relatively thin, flexible magnetic reed arranged with its principal axis extending horizontally, means for rigidly supporting one end of said reed with the broad face thereof in a vertical plane to provide a greater degree of flexure of the reed horizontally than vertically, a stylus supported entirely by said reed near the free end thereof and arranged with its axis substantially in a vertical direction, a magnetic structure adjacent the flexing portion of said reed, and a coil inductively influenced by motion of said reed.*

*29. A stylus mounting according to claim 28 wherein said coil surrounds the flexing portion of said reed.*

*30. An electric translating device comprising, in combination, a magnetic circuit including a pair of pole pieces defining a narrow air gap arranged in a vertical plane, a thin, flexible, relatively broad magnetic reed mounted in the median plane of said air gap with its axis in a substantially horizontal position, means for rigidly supporting one end of said reed with the other end thereof being free and positioned within said air gap, said supporting means serving to permit lateral flexure of said free end, a stylus secured to and supported entirely by the free end of said reed with its axis located substantially within a vertical plane and extending substantially at right angles to the axis of said reed, said reed being included in said magnetic circuit, and a pickup coil surrounding a portion of said magnetic circuit.*

*31. An electric translating device comprising, in combination, a magnetic structure including a pair of spaced pole pieces providing an air gap in a vertical plane, an armature comprising an elongated magnetic reed formed of relatively thin strip material, mounting means for supporting said reed with its axis in a horizontal position and arranged substantially in the plane of said air gap, said mounting means comprising a fixed support spaced from said pole pieces for rigidly supporting one end of said reed with the other end thereof being free and positioned adjacent said pole pieces to vary the flux of said pole pieces when the free end of said reed moves transversely of the plane of said air gap, the supported end of said reed having its broad face arranged in a vertical plane to provide relatively free lateral flexure of the reed, and a stylus supported entirely by said reed near the free end thereof with its axis positioned substantially vertically, and a stationary pickup coil surrounding a part of said magnetic structure in which the flux is varied by transverse movement of the free end of said armature.*

DONALD J. BAKER.

REFERENCES CITED

The following references are of record in the file of this patent or the original patent:

UNITED STATES PATENTS

| Number | Name | Date |
|---|---|---|
| 1,573,739 | O'Neill | Feb. 16, 1926 |
| 1,756,966 | Alden | May 6, 1930 |
| 1,836,153 | Capps | Dec. 15, 1931 |
| 2,038,687 | Sykes | Apr. 28, 1936 |
| D. 135,953 | Williamson | July 6, 1943 |

FOREIGN PATENTS

| Number | Country | Date |
|---|---|---|
| 285,454 | Great Britain | Feb. 21, 1929 |
| 416,574 | Great Britain | Sept. 13, 1934 |
| 764,896 | France | May 29, 1934 |